United States Patent
Uneura

(10) Patent No.: US 9,470,240 B2
(45) Date of Patent: Oct. 18, 2016

(54) THRUST BEARING STRUCTURE AND SUPERCHARGER EQUIPPED WITH SAID THRUST BEARING STRUCTURE

(71) Applicant: IHI Corporation, Koto-ku (JP)

(72) Inventor: Yutaka Uneura, Tokyo (JP)

(73) Assignee: IHI Corporation, Koto-ku (JP)

( * ) Notice: Subject to any disclaimer, the term of this patent is extended or adjusted under 35 U.S.C. 154(b) by 416 days.

(21) Appl. No.: 14/058,848

(22) Filed: Oct. 21, 2013

(65) Prior Publication Data

US 2014/0044540 A1 Feb. 13, 2014

Related U.S. Application Data

(63) Continuation of application No. PCT/JP2012/060209, filed on Apr. 16, 2012.

(30) Foreign Application Priority Data

Apr. 27, 2011 (JP) ................................. 2011-099232

(51) Int. Cl.
*F04D 29/057* (2006.01)
*F16C 32/06* (2006.01)
(Continued)

(52) U.S. Cl.
CPC ........... *F04D 29/057* (2013.01); *F16C 17/047* (2013.01); *F16C 32/0629* (2013.01); *F16C 33/1075* (2013.01); *F02B 39/14* (2013.01); *F16C 2360/24* (2013.01)

(58) Field of Classification Search
CPC .. F04D 29/057; F16C 17/047; F16C 3/1075; F16C 2360/24; F02B 39/14
See application file for complete search history.

(56) References Cited

U.S. PATENT DOCUMENTS 6,126,414 A 10/2000 Koike
7,470,064 B2 * 12/2008 Link .................... F01D 25/168
384/121
(Continued)

FOREIGN PATENT DOCUMENTS

CN 1201105 A 12/1998
CN 1802515 A 7/2006
(Continued)

OTHER PUBLICATIONS

Combined Chinese Office Action and Search Report issued Nov. 17, 2015 in Patent Application No. 201280020086.3 (with English language translation).

(Continued)

*Primary Examiner* — Igor Kershteyn
(74) *Attorney, Agent, or Firm* — Oblon, McClelland, Maier & Neustadt, L.L.P.

(57) ABSTRACT

A thrust bearing structure is equipped with a thrust collar having a collar pad, and a thrust bearing having a bearing pad at a position corresponding to the collar pad on a surface facing the thrust collar. The bearing pad has a tapered section, and a land section continuously formed on the outer edge of the tapered section. Assuming that oil droplets are supplied between the bearing pad and the collar pad, and assuming that the rotation speed of a rotor shaft is constant, the tapered section would have a sloping surface formed in such a manner that a wall thickness gradually becomes thicker toward the downstream side along the trajectory of given oil droplets based on the centrifugal forces acting on the droplets due to the rotation of the rotor shaft.

18 Claims, 10 Drawing Sheets

(51) Int. Cl.
  *F16C 17/04* (2006.01)
  *F16C 33/10* (2006.01)
  *F02B 39/14* (2006.01)

(56) References Cited

U.S. PATENT DOCUMENTS

2006/0165325 A1   7/2006  Link et al.
2010/0061668 A1*  3/2010  Petitjean ............... F01D 25/166
                                                      384/99

FOREIGN PATENT DOCUMENTS

| CN | 101705963 A | 5/2010 |
| DE | 296 24 507 U1 | 11/2004 |
| EP | 2 163 731 A1 | 3/2010 |
| JP | 02-000410 | 1/1990 |
| JP | 2000-046041 A | 2/2000 |
| JP | 2002-364635 A | 12/2002 |
| JP | 2008-101750 A | 5/2008 |
| JP | 2009-243300 A | 10/2009 |
| JP | 2009-243431 A | 10/2009 |
| WO | WO 2005/003577 A1 | 1/2005 |

OTHER PUBLICATIONS

Extended European Search Report issued Jul. 22, 2015 in Patent Application No. 12776878.6.
International Search Report mailed Jun. 19, 2012 for PCT/JP2012/060209 filed on Apr. 16, 2012 with English Translation.
International Written Opinion mailed Jun. 19, 2012 for PCT/JP2012/060209 filed on Apr. 16, 2012.
Combined Chinese Office Action and Search Report issued Apr. 3, 2015 in Patent Application No. 201280020086.3 (with English language translation).

* cited by examiner

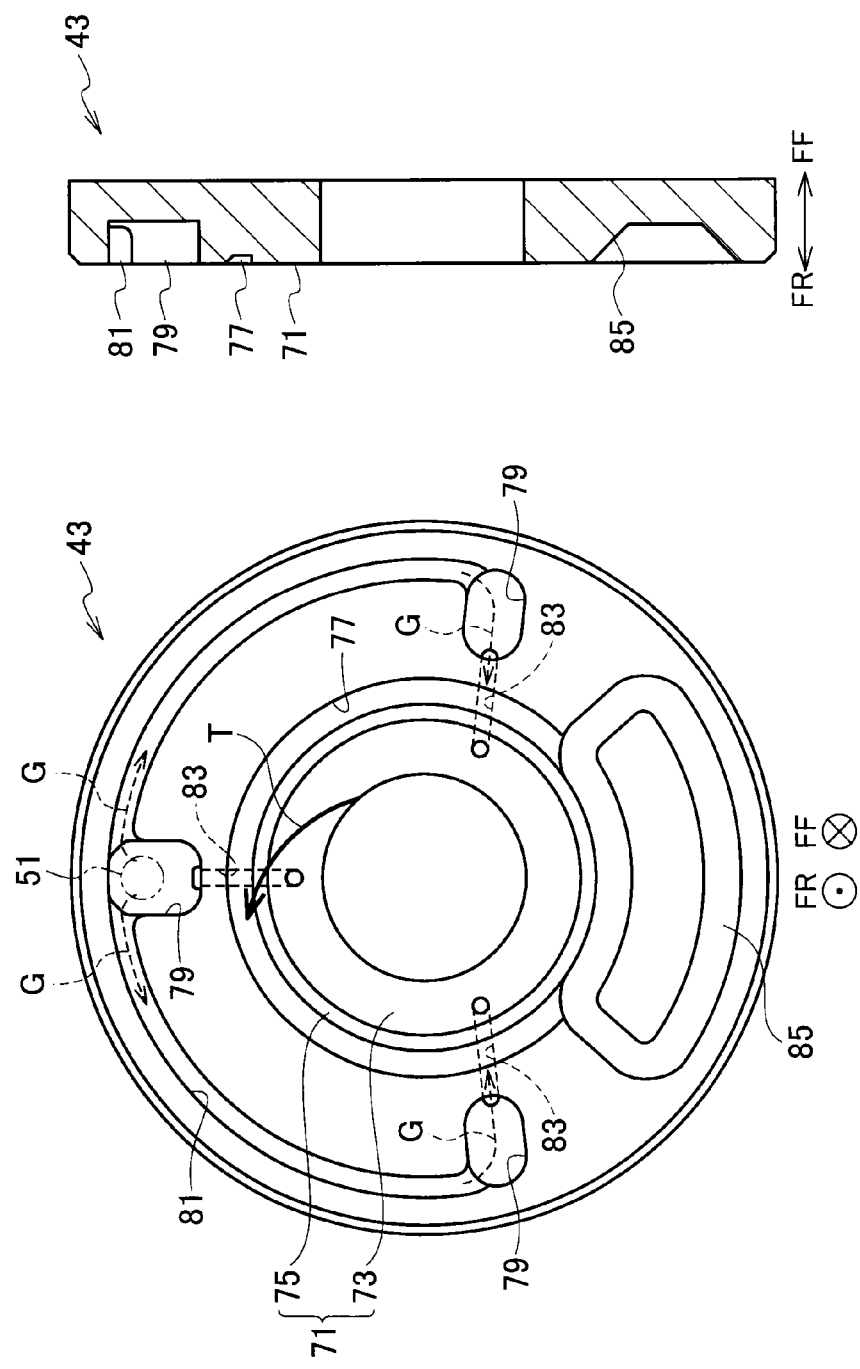

FR ⟷ FF

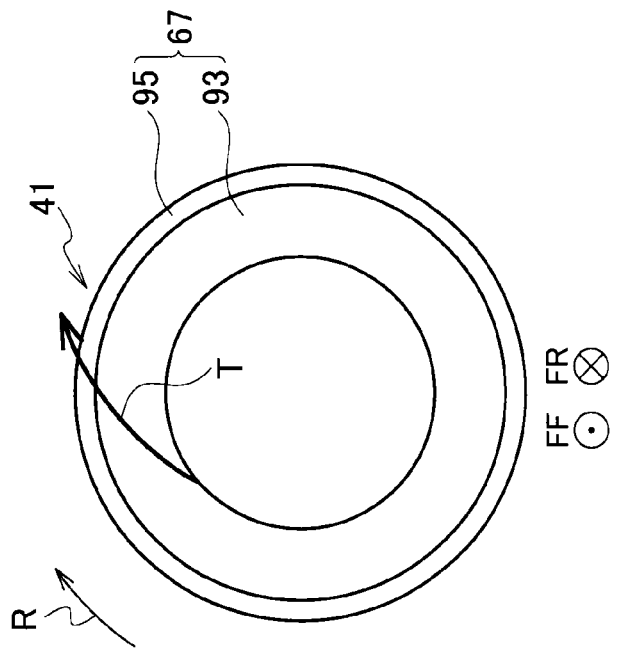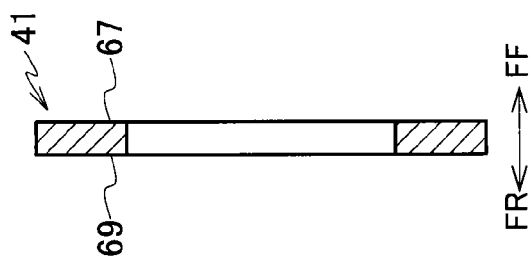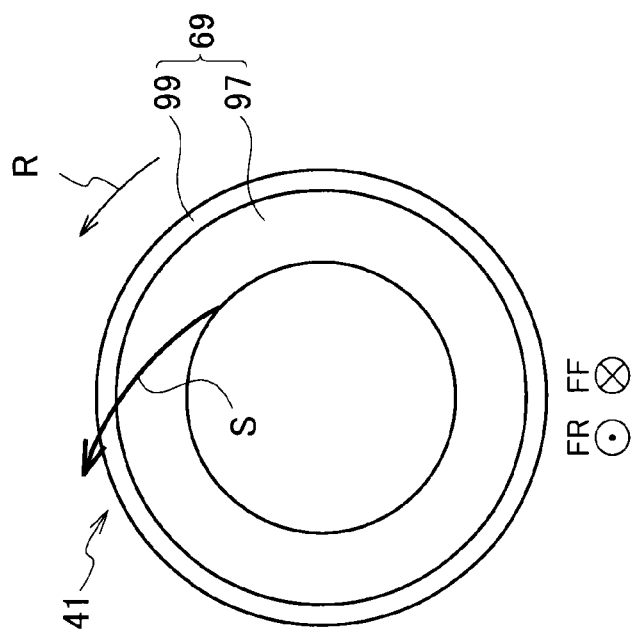

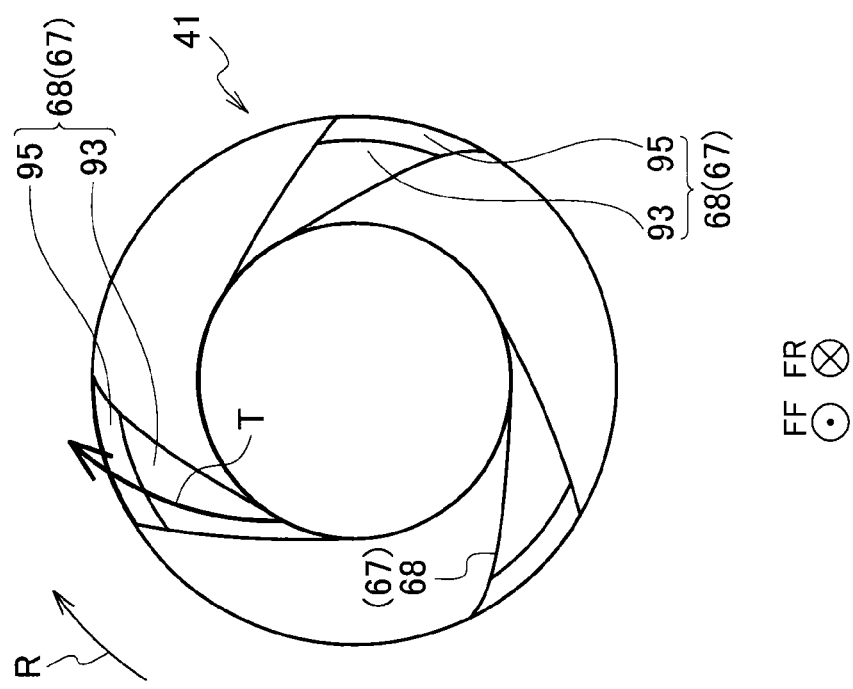
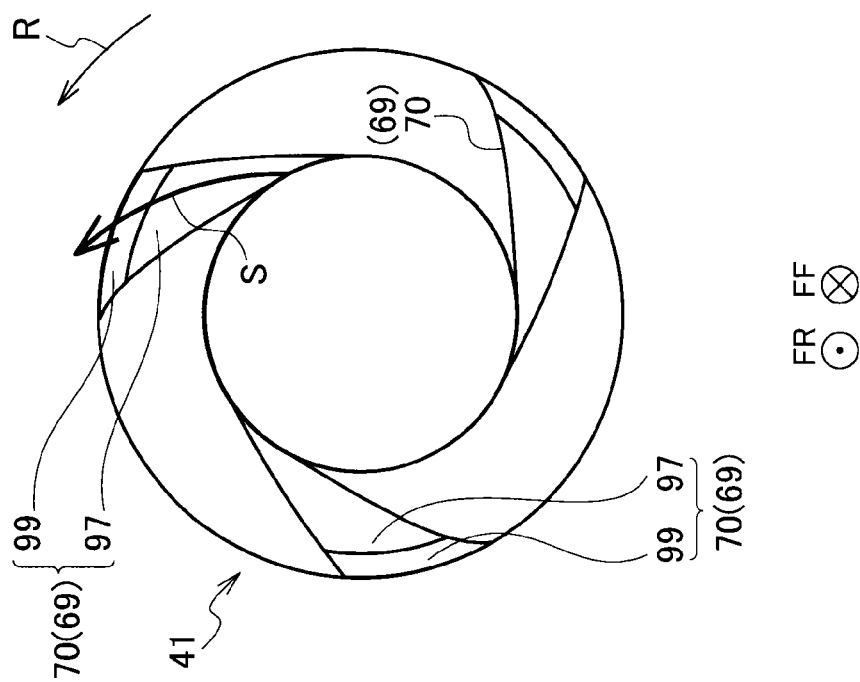

US 9,470,240 B2

THRUST BEARING STRUCTURE AND SUPERCHARGER EQUIPPED WITH SAID THRUST BEARING STRUCTURE

CROSS REFERENCE TO RELATED APPLICATIONS

This application is a continuation application of International Application No. PCT/JP2012/060209, filed on Apr. 16, 2012, which claims priority to Japanese Patent Application No. 2011-099232, filed on Apr. 27, 2011, the entire contents of which are incorporated by references herein.

BACKGROUND OF THE INVENTION

1. Field of the Invention

The present invention relates to a thrust bearing structure configured to bear a thrust load applied in an axial direction, and a supercharger equipped with the thrust bearing structure.

2. Description of the Related Art

A supercharger known as an example of rotary machines includes a housing, a rotor shaft rotatably provided to the housing, a compressor impeller attached to one end of the rotor shaft, and a turbine impeller attached to the other end of the rotor shaft. The compressor impeller compresses air by using a centrifugal force while the turbine impeller generates torque by using pressure energy of an exhaust gas. The compressor impeller and the turbine impeller are connected to each other through the rotor shaft and these impellers therefore rotate as a unit. At the time of the rotation, the rotor shaft receives loads applied not only in a rotating direction but also in an axial direction. For this reason, the supercharger is equipped with a thrust bearing structure configured to bear the load in the axial direction (so called a thrust load).

Concerning the thrust bearing structure, Japanese Patent Application Laid-open Publication No. 2002-364635 discloses a structure that utilizes a wedge effect of lubricating oil. A thrust bearing structure of PTL 1 includes a thrust collar and a thrust bearing. The thrust collar and the thrust bearing are each formed into an annular shape and are arranged facing each other in the axial direction of the rotor shaft. The thrust collar is fixed to the rotor shaft and rotates as a unit together with the rotor shaft.

Meanwhile, the thrust collar includes a collar pad on one surface thereof. A surface of the collar pad is orthogonal to a shaft center of the rotor shaft. On the other hand, the thrust bearing includes multiple bearing pads on a surface thereof facing the collar pad. Each bearing pad includes a tapered section and a land section. A surface of the tapered section is inclined in such a manner as to gradually get closer to the collar pad in the rotating direction of the rotor shaft. In other words, the tapered section is formed to have a wall thickness that gradually becomes thicker in the rotating direction of the rotor shaft. A surface of the land section is orthogonal to the shaft center of the rotor shaft and continuous with the leading end of the tapered section in the rotating direction. That is to say, when the collar pad of the thrust collar and the bearing pad of the thrust bearing face each other, the clearance therebetween becomes smallest at the land section.

An interspace between the collar pad and the thrust bearing is filled with lubricating oil. When the rotor shaft rotates together with the collar pad, the lubricating oil flows in their rotating direction due to the rotation and viscosity of the lubricating oil. Meanwhile, as described above, the clearance between the collar pad and the bearing pad becomes smallest at the land section. Hence, the flow of the lubricating oil converges between the land section and the collar pad. As a consequence, a pressure inside the lubricating oil is increased at the land section and at a portion of the tapered section near the land section, thereby drawing the collar pad and the thrust bearing away from each other. This effect is generally referred to as a wedge effect. While the supercharger is in operation, the thrust load acting on the rotor shaft can be borne by this wedge effect.

SUMMARY OF THE INVENTION

It is an urgent issue for a rotary machine to secure a high bearing performance against a thrust load. This is due to the following reason. Specifically, in the case of a supercharger, there is a strong demand for an improvement in a pressure ratio, an expansion ratio or the like, which involves an increase in a thrust load that acts on a rotor shaft.

An object of the present invention is to provide a thrust bearing structure of a novel configuration which can secure high-level capacity against load and a supercharger equipped with the thrust bearing structure.

A first aspect of the present invention is a thrust bearing structure configured to bear a thrust load in an axial direction acting on a rotor shaft, comprising: a thrust collar fixed to the rotatable rotor shaft; and a thrust bearing facing the thrust collar, wherein the thrust collar includes a collar pad on a surface thereof facing the thrust bearing, the thrust bearing includes a bearing pad on a surface thereof facing the thrust collar at a position corresponding to the collar pad, a certain one of the collar pad and the bearing pad includes a tapered section, and a land section formed continuously with an outer edge of the tapered section, given an oil droplet between the bearing pad and the collar pad, the tapered section includes a sloping surface formed in such a manner that a wall thickness of the tapered section gradually becomes thicker along a trajectory of the oil droplet toward a downstream side thereof, the trajectory determined based on a centrifugal force generated by rotation of the rotor shaft and applied to the oil droplet, and the land section has a flat surface which is orthogonal to a shaft center of the rotor shaft.

A second aspect of the present invention is a supercharger configured to supercharge air to be supplied to an engine by using energy of an exhaust gas from the engine, comprising: a housing; the rotor shaft rotatably provided to the housing; a compressor impeller attached to one end of the rotor shaft and configured to compress a gas by using a centrifugal force; a turbine impeller attached to the other end of the rotor shaft and configured to generate torque by using pressure energy of a gas; and a thrust bearing structure configured to bear a thrust load in an axial direction acting on the rotor shaft, wherein the thrust bearing structure includes: a thrust collar fixed to the rotor shaft; and a thrust bearing facing the thrust collar, the thrust collar includes a collar pad on a surface thereof facing the thrust bearing, the thrust bearing includes a bearing pad on a surface thereof facing the thrust collar at a position corresponding to the collar pad, any one pad of the collar pad and the bearing pad includes a tapered section, and a land section formed continuously with an outer edge of the tapered section, given an oil droplet between the bearing pad and the collar pad, the tapered section includes a sloping surface formed in such a manner that a wall thickness of the tapered section gradually becomes thicker along a trajectory of the oil droplet toward a downstream side thereof, the trajectory determined based on a centrifugal force generated by rotation of the rotor shaft and applied to the oil droplet, and the land section has a flat surface which is orthogonal to a shaft center of the rotor shaft.

The any one pad may be formed into an annular shape.

A plurality of the any one pads may be arranged in a circumferential direction.

The trajectory of the oil droplet is a trajectory obtained on an assumption that a rotation speed of the rotor shaft is constant.

According to the present invention, it is possible to provide a thrust bearing structure of a novel configuration which can secure high-level capacity against load and a supercharger equipped with the thrust bearing structure.

BRIEF DESCRIPTION OF THE DRAWINGS

FIG. 3A is a view showing a rear-side face (a back face) of a first thrust bearing according to the embodiment of the present invention.

FIG. 3B is a sectional side view of the first thrust bearing according to the embodiment of the present invention.

FIG. 7A is a view showing a rear-side face (a back face) of a thrust collar according to the embodiment of the present invention.

FIG. 7B is a sectional side view of the thrust collar according to the embodiment of the present invention.

FIG. 7C is a view showing a front-side face of the thrust collar according to the embodiment of the present invention.

FIG. 11A is a view showing a rear-side face (a back face) of a thrust collar according to the embodiment of the present invention.

FIG. 11B is a view showing a front-side face of the thrust collar according to the embodiment of the present invention.

DESCRIPTION OF THE PREFERRED EMBODIMENTS

Figure 1:
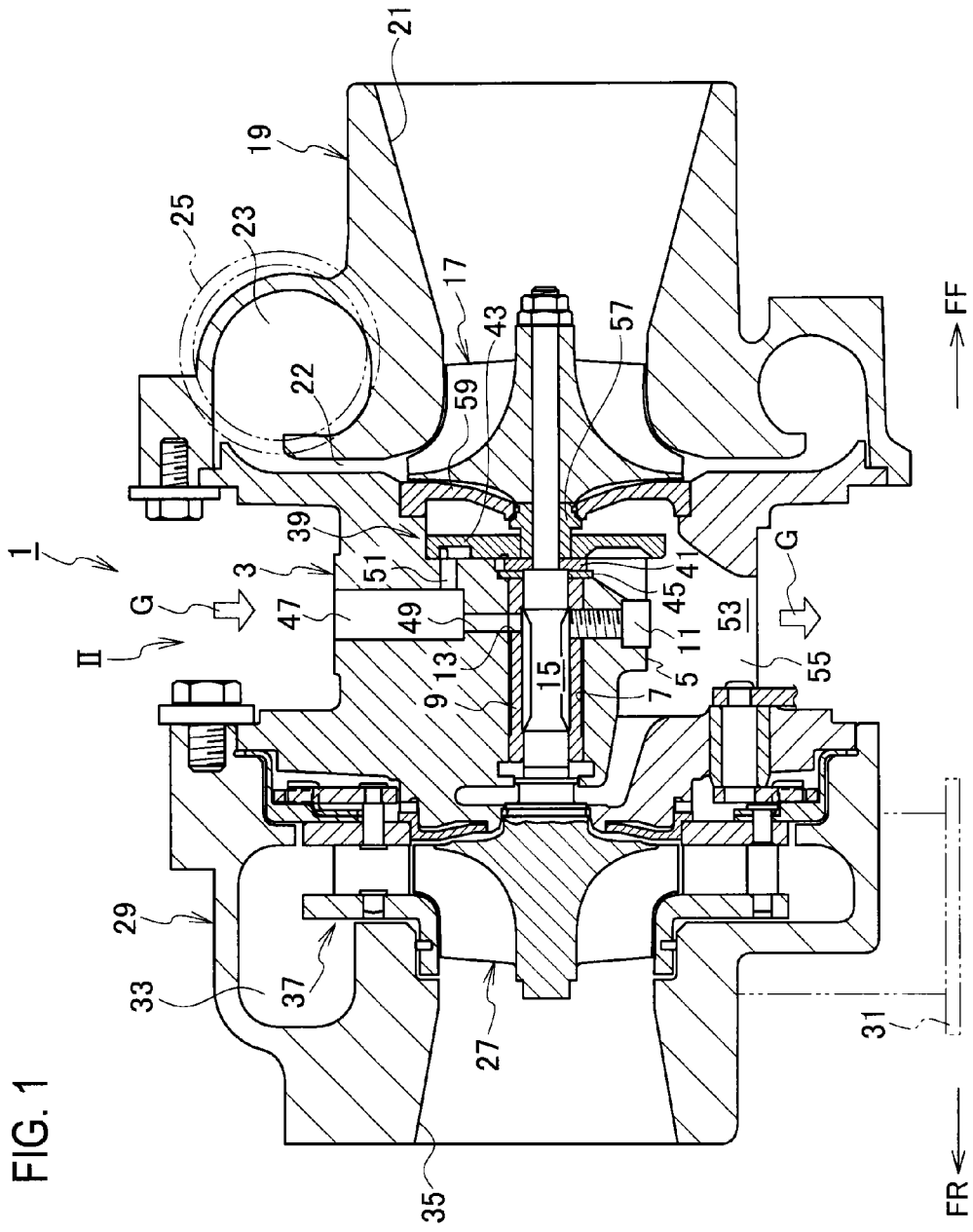
FIG. 1 is a sectional side view of a vehicle supercharger according to an embodiment of the present invention.

An embodiment of the present invention will be described with reference to FIG. 1 to FIG. 10. In the drawings, "FF" indicates a frontward direction and "FR" indicates a rearward direction. Note that these directions do not limit the present invention.

Figure 2:
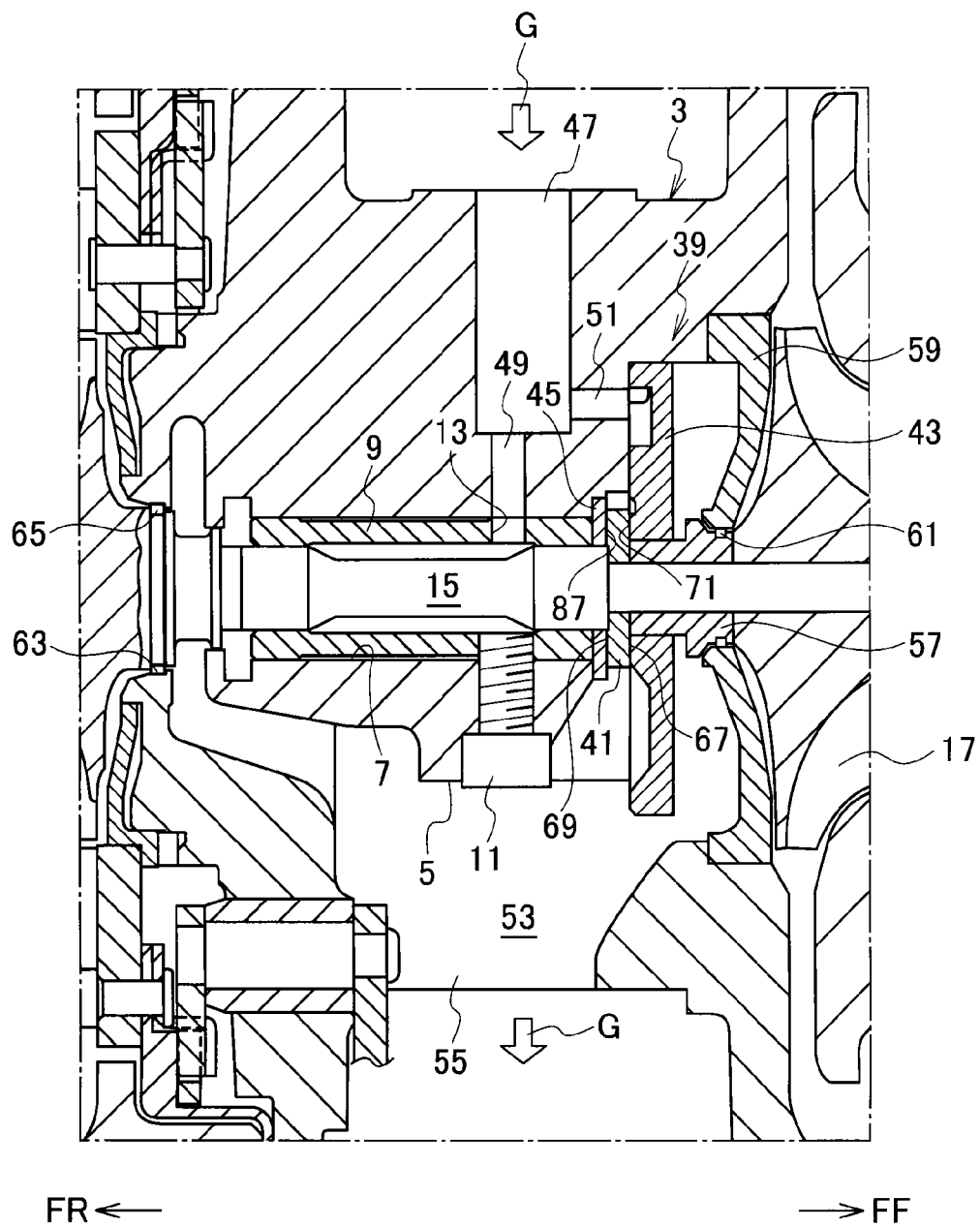
FIG. 2 is an enlarged view of a portion indicated with an arrow II in FIG. 1.

FIG. 1 and FIG. 2 show a supercharger 1 of this embodiment. The supercharger 1 is used in an automobile, for example, and is configured to supercharge (compress) air to be supplied to an engine (not illustrated) by using energy of an exhaust gas from the engine.

The supercharger 1 includes a housing (a bearing housing) 3. The housing 3 includes therein a support block 5 constituting part of the housing 3. An installation hole 7 extending in a front-rear direction is formed in the support block 5 in a penetrating manner.

A semi-floating metal 9 as an example of a radial bearing is installed inside the installation hole 7. A locking pin 11 is inserted into a side face of the semi-floating metal 9 through the support block 5 so as to block rotation of the semi-floating metal 9. Here, a through-hole 13 is formed in an intermediate portion of the semi-floating metal 9 in a penetrating manner.

The semi-floating metal 9 rotatably supports a rotor shaft 15 that extends in the front-rear direction. In other words, the rotor shaft 15 is rotatably provided in the support block 5 with the semi-floating metal 9 in between. A compressor impeller 17 and a turbine impeller 27 are attached to a front end and a rear end of the rotor shaft 15, respectively. Thus, the compressor impeller 17, the turbine impeller 27, and the rotor shaft 15 rotate as a unit. The compressor impeller 17 compresses a gas (such as the air) by using a centrifugal force. The turbine impeller 27 generates torque by using pressure energy of the exhaust gas.

A compressor housing 19 is provided on a front side of the housing 3 to house the compressor impeller 17. In addition, the compressor housing 19 includes an intake port 21, a diffuser 22, a scroll flow passage (a compressor scroll flow passage) 23 in a scroll shape, and an exhaust port 25. The intake port 21 is opened toward the front of the supercharger 1 in such a manner as to communicate with an inlet side of the compressor impeller 17. The diffuser 22 is formed on an outlet side of the compressor impeller 17 and is configured to decelerate and compress the gas emitted from the compressor impeller 17. The scroll flow passage 23 is provided in such a manner as to communicate with an outlet side of the diffuser 22 while the exhaust port 25 is formed in such a manner as to communicate with an outlet side of the scroll flow passage 23. As a consequence, the compressed gas decelerated by the diffuser 22 passes through the scroll flow passage 23 and is emitted from the exhaust port 25.

A turbine housing 29 is provided on a rear side of the housing 3 to house the turbine impeller 27. The turbine housing 29 includes an intake port 31, a scroll flow passage (a turbine scroll flow passage) 33 in a scroll shape, and an exhaust port 35. The intake port 31 is formed in such a manner as to communicate with an inlet side of the scroll flow passage 33 while the scroll flow passage 33 is provided in such a manner that its outlet side communicates with an inlet side of the turbine impeller 27. The exhaust port 35 is opened toward the rear of the supercharger 1 in such a manner as to communicate with an outlet side of the turbine impeller 27. As a consequence, the exhaust gas having flowed in from the intake port 31 passes through the scroll flow passage 33 and flows into the turbine impeller 27. The exhaust gas having flowed into the turbine impeller 27 drives and rotates the turbine impeller 27 using its pressure. Then, the exhaust gas is emitted from the exhaust port 35.

A variable nozzle mechanism 37 configured to change a flow passage area (a flow rate) of the exhaust gas to be supplied to the turbine impeller 27 may be disposed between the scroll flow passage 33 and the turbine impeller 27 inside the turbine housing 29. Here, the variable nozzle mechanism 37 employs a publicly-known structure. Accordingly, descriptions of details of the variable nozzle mechanism 37 are omitted herein. Instead, the contents of Japanese Patent Application Laid-open Publications No. 2009-243300 and No. 2009-243431, for example, are incorporated herein by reference to constitute part of this specification.

As shown in FIG. 2, the supercharger 1 includes a thrust bearing structure 39. The thrust bearing structure 39 bears thrust loads in axial directions acting on the rotor shaft 15 by using a wedge effect of lubricating oil G. The thrust bearing structure 39 includes a thrust collar 41 fixed to the rotor shaft 15, a thrust bearing (a first thrust bearing) 43 provided in front of the thrust collar 41, and a thrust bearing (a second thrust bearing) 45 provided behind the thrust collar 41. The thrust bearing 43 is configured to bear a thrust load in the frontward direction while the thrust bearing 45 is configured to bear a thrust load in the rearward direction. Details of the thrust bearing structure 39 will be described later.

As shown in FIG. 2, the housing 3 includes an oil supply port 47 formed at its upper part (an upper portion of the housing 3 shown in FIG. 2), an oil supply passage (a first oil supply passage) 49 formed in the support block 5, and an oil supply passage (a second oil supply passage) 51 formed in the support block 5. The oil supply port 47 takes in the lubricating oil G. The oil supply passage 49 connects the oil supply port 47 to the installation hole 7 for supplying the lubricating oil G between the semi-floating metal 9 and the rotor shaft 15. Further, the oil supply passage 51 connects the oil supply port 47 to a position of installation of the thrust bearing structure 39 for supplying the lubricating oil G between the thrust bearing 43 and the thrust collar 41 as well as between the thrust bearing 45 and the thrust collar 41.

As shown in FIG. 2, the housing 3 includes a receiving chamber 53 for receiving the lubricating oil G, which is located below the support block 5 (at a lower part in FIG. 2). In addition, an oil drain port 55 is formed at a lower part of the receiving chamber 53. The lubricating oil G having flowed into the receiving chamber 53 is drained out of the housing 3 through the oil drain port 55.

As shown in FIG. 2, an oil shield 57 is fixed to the rotor shaft 15. The oil shield 57 is located between the compressor impeller 17 and the thrust collar 41. In addition, an annular seal plate 59 is provided in such a way as to surround an outer circumferential surface of the oil shield 57. A seal ring 61 is provided between the outer circumferential surface of the oil shield 57 and an inner circumferential surface of the seal plate 59. The seal ring 61 suppresses a leakage of the lubricating oil G from the inside of the housing 3 to an installation space for the compressor impeller 17 and a leakage of the gas (the air) from the installation space for the compressor impeller 17 to the inside of the housing 3.

As shown in FIG. 2, an insertion hole 63 for enabling insertion of the rotor shaft 15 is formed in a rear side portion of the housing 3. A seal ring 65 is provided between the insertion hole 63 and an outer circumferential surface of the rotor shaft 15. The seal ring 65 suppresses a leakage of the lubricating oil G from the inside of the housing 3 to an installation space for the turbine impeller 27 and a leakage of the exhaust gas from the installation space for the turbine impeller 27 to the inside of the housing 3.

Next, a configuration of the thrust bearing structure 39 according to the embodiment will be described in detail.

As shown in FIG. 2, the thrust bearing structure 39 includes the thrust collar 41. The thrust collar 41 is formed into a flat annular shape and is fixed to the rotor shaft 15 that penetrates the center of the thrust collar 41. The thrust collar 41 includes a collar pad (a first collar pad) 67 on its front face. The collar pad 67 is formed as an annular flat surface which is orthogonal to the rotor shaft 15. In addition, the thrust collar 41 includes a collar pad (a second collar pad) 69 on its back face. Similarly to the collar pad 67, the collar pad 69 is formed as an annular flat surface which is orthogonal to the rotor shaft 15.

The thrust bearing structure 39 includes the thrust bearing (the first thrust bearing) 43 provided in front of the thrust collar 41. The thrust bearing 43 bears the thrust load in the frontward direction transmitted via the thrust collar 41. The thrust bearing 43 includes a bearing pad (a first bearing pad) 71 on its surface facing the collar pad 67 of the thrust collar 41. The lubricating oil G is present between the bearing pad 71 and the collar pad 67. As a consequence, the thrust collar 41 can rotate smoothly on the thrust bearing 43 by the wedge effect (to be described later) of the lubricating oil G even during the occurrence of the above-described thrust load.

As shown in FIG. 3A, the bearing pad 71 includes a tapered section 73, and a land section 75 formed continuously with an outer edge of the tapered section 73. Each of the tapered section 73 and the land section 75 is formed into an annular shape when viewed in the direction of a rotating axis (the front-rear direction).

Figure 4A:
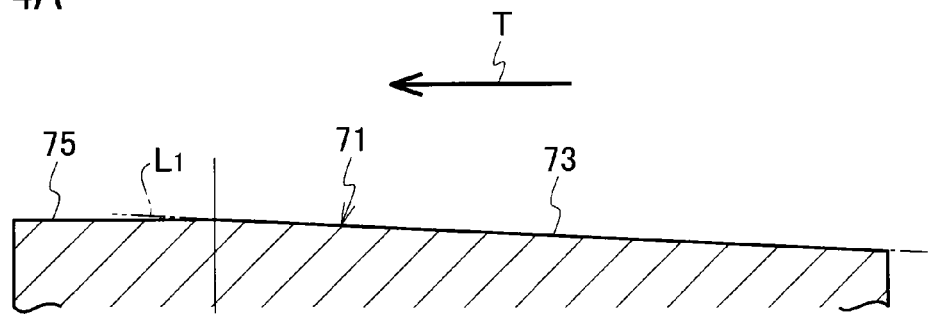
FIG. 4A is a cross-sectional view of a first bearing pad taken along a trajectory of given oil droplets.

As shown in FIG. 4A, the tapered section 73 has a sloping surface formed to have a wall thickness that gradually becomes thicker along a trajectory (a trajectory direction) T of given oil droplets toward a downstream side of the trajectory T. In other words, the tapered section 73 has the sloping surface formed to get closer to a surface (such as the collar pad 67 of the thrust collar 41), which is located behind the bearing pad 71 and orthogonal to a shaft center of the rotor shaft 15, as the sloping surface gets farther away from the shaft center of the rotor shaft 15. Given a circle of an arbitrary radius having the shaft center of the rotor shaft 15 as its center, the wall thickness of the tapered section 73 is constant on this circle. For the convenience of description, the trajectory T of given oil droplets will be hereinafter simply referred to as the trajectory T.

Figure 4B:
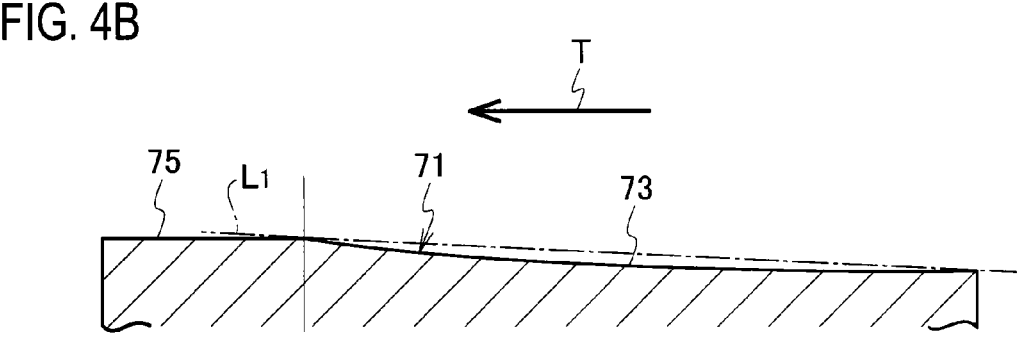
FIG. 4B and FIG. 4C show modified examples of the first bearing pad.
Figure 4C:
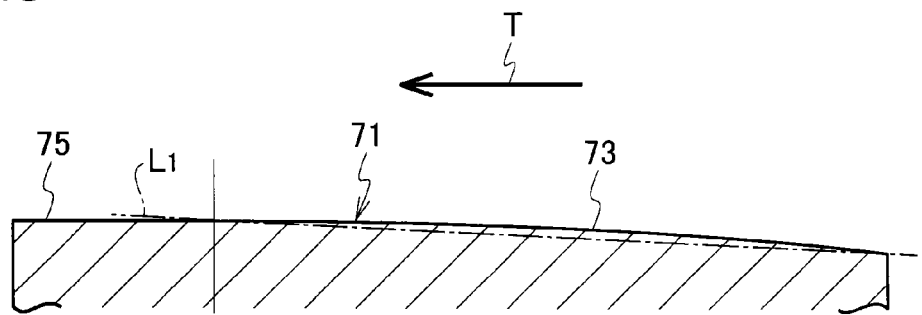

Here, the inclination of the sloping surface of the tapered section 73 may vary in any manner as far as the tapered section 73 is formed in such a manner that the wall thickness gradually becomes thicker toward the downstream side of the trajectory T. Specifically, the sloping surface may have a constant inclination containing a straight line L1 as shown in FIG. 4A, or may be formed to protrude downward relative to the straight line L1 as shown in FIG. 4B, or may be formed to protrude upward relative to the straight line L1 as shown in FIG. 4C.

In the meantime, the land section 75 has a flat surface which is formed to be continuous with the tapered section 73 on a downstream side of the trajectory T. The flat surface is orthogonal to the shaft center of the rotor shaft 15. Accordingly, a wall thickness of the land section 75 is constant in the circumferential direction.

Here, the trajectory T is a trajectory of oil droplets of the lubricating oil G to be supplied between the bearing pad 71 and the collar pad 67 on the assumption that a rotation speed of the rotor shaft 15 is constant while the supercharger 1 is in operation. A moving direction of the oil droplets is determined based on a centrifugal force which is generated by rotation of the rotor shaft 15 and applied to the oil droplets. In other words, the trajectory T indicates the trajectory of the oil droplets that move under influence of the centrifugal force.

Figure 5:
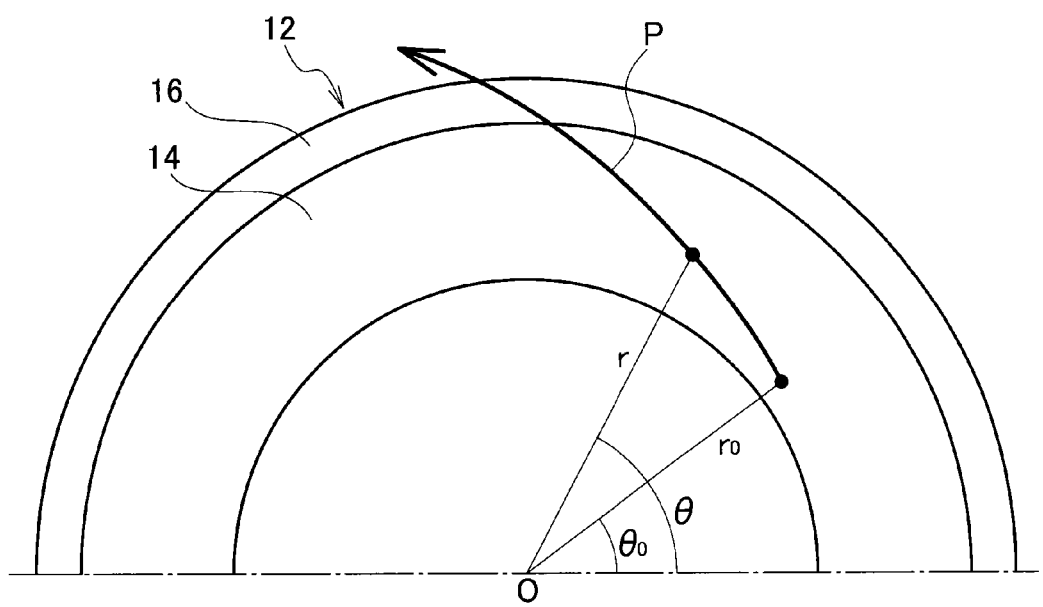
FIG. 5 is a view for explaining a radial component and an angular component (a circumferential component) of a trajectory of an oil droplet.

A trajectory of an oil droplet will be described by using FIG. 5. FIG. 5 shows a pad 12 including a tapered section 14 having the above-described sloping surface and a land section 16 having the above-described flat surface. A polar coordinate system using the center O of the pad 12 as the center is employed to specify a position on the pad 12, and an oil droplet is assumed to rotate counterclockwise at a constant velocity around the center O. Given the assumption, if an initial position of the oil droplet on the pad 12 has a radial component r and an angular component equal to $r_0$ (excluding zero) and $\theta_0$, respectively, then the oil droplet moves on a trajectory indicated with P since the oil droplet is subjected to a centrifugal force generated at the time of rotation. This trajectory P corresponds to the trajectory T in FIG. 3 or a trajectory S in FIG. 6 to be described later. Here, the radial component r at an arbitrary point on the trajectory P can be calculated by the following expression when the angular component at the same position is represented by $\theta$:

$$r = r_0 \exp[(\theta - \theta_0)^2 / 2].$$

As shown in FIG. 3A and FIG. 3B, the thrust bearing 43 includes an arc-shaped recessed section 77 and a reservoir pocket 85 in its back face. Both the recessed section 77 and the reservoir pocket 85 are located on the outer circumference of the bearing pad 71. The reservoir pocket 85 communicates with the recessed section 77. Specifically, the reservoir pocket 85 is formed at a lower part in the back face of the thrust bearing 43 in such a manner that part of the reservoir pocket 85 is sandwiched between two end portions of the recessed section 77. The recessed section 77 receives the lubricating oil G drained from the land section 75 of the bearing pad 71. In the meantime, the reservoir pocket 85 is also adjacent to the land section 75 and therefore has a similar function to that of the recessed section 77. In addition, the reservoir pocket 85 is formed wide in the radial direction of the recessed section 77. Accordingly, the reservoir pocket 85 can also temporarily reserve the lubricating oil G that has flowed into the recessed section 77.

The thrust bearing 43 includes multiple oil supply pockets 79 and a groove 81 in its back face. The oil supply pockets 79 are formed outside the recessed section 77 in the radial direction at intervals in the circumferential direction. Three oil supply pockets 79 are formed in the aspect of FIG. 3A. Among them, the central oil supply pocket 79 is located facing an opening of the oil supply passage 51. The groove 81 is formed into an arc shape along a circumferential edge of the back face of the thrust bearing 43 so as to connect the multiple oil supply pockets 79 to one another. Accordingly, in the aspect of FIG. 3A, each of the oil supply pockets 79 communicates with the oil supply passage 51 through the groove 81 except for the central oil supply pocket 79.

The thrust bearing 43 includes communication passages 83 that communicate with the oil supply pockets 79. Each communication passage 83 is a through-hole, and has one end opened to the corresponding oil supply pocket 79 and the other end opened to the tapered section 73 of the bearing pad 71. Accordingly, the lubricating oil G supplied from the oil supply passage 51 passes through the oil supply pockets 79 and the groove 81 as the case may be, and reaches the tapered section 73 through the communication passages 83.

As shown in FIG. 2, the thrust bearing structure 39 includes the thrust bearing (the second thrust bearing) 45 provided on the rear side of the thrust collar 41. The thrust bearing 45 bears the thrust load in the rearward direction transmitted through the thrust collar 41. The thrust bearing 45 includes a bearing pad (a second bearing pad) 87 on its surface facing the collar pad 69 of the thrust collar 41. The lubricating oil G is present between the bearing pad 87 and the collar pad 69. As a consequence, the thrust collar 41 can rotate smoothly on the thrust bearing 45 by the wedge effect (to be described later) of the lubricating oil G even during the occurrence of the above-described thrust load.

Figure 6A:
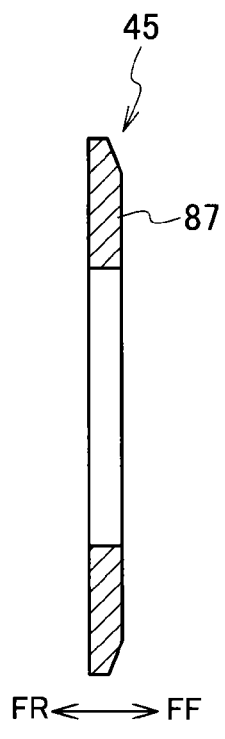
FIG. 6A is a sectional side view of a second thrust bearing according to the embodiment of the present invention.
Figure 6B:
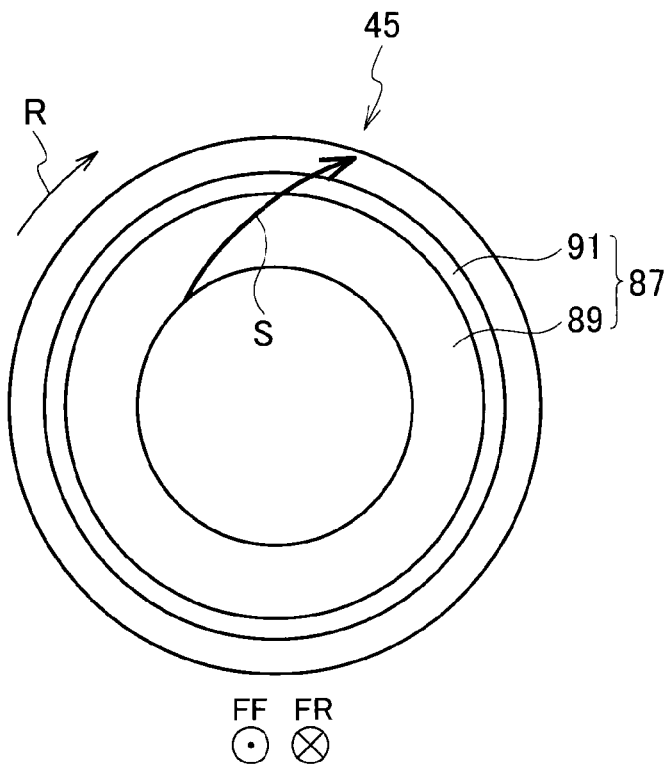
FIG. 6B is a view showing a front-side face (a front face) of the second thrust bearing

As shown in FIG. 6A, the bearing pad 87 includes a tapered section 89, and a land section 91 formed continuously with an outer edge of the tapered section 89. Each of the tapered section 89 and the land section 91 is formed into an annular shape when viewed in the direction of the rotating axis (the front-rear direction).

Figure 6C:
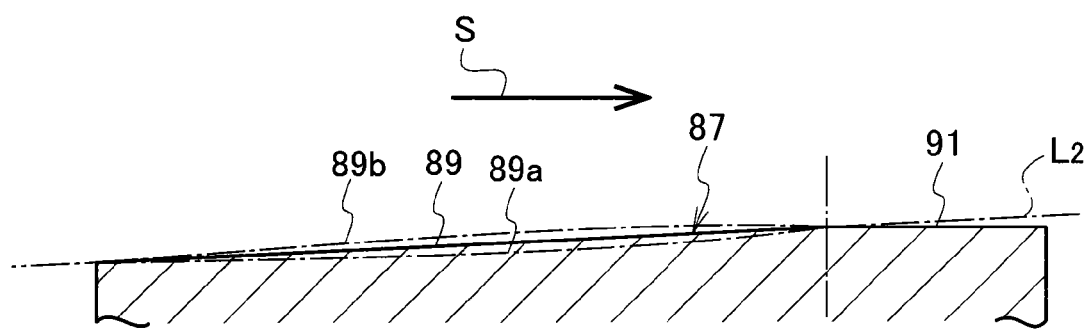
FIG. 6C is a cross-sectional view of a second bearing pad in FIG. 6B taken along a trajectory of given oil droplets.

As shown in FIG. 6C, the tapered section 89 has a sloping surface formed in such a manner that its wall thickness gradually becomes thicker along a trajectory (a trajectory direction) S of given oil droplets toward a downstream side of the trajectory S. In other words, the tapered section 89 has the sloping surface formed to get closer to a surface (such as the collar pad 69 of the thrust collar 41), which is located in front of the bearing pad 87 and orthogonal to the shaft center of the rotor shaft 15, as the sloping surface gets farther away from the shaft center of the rotor shaft 15. Given a circle of an arbitrary radius having the shaft center of the rotor shaft 15 as its center, the wall thickness of the tapered section 89 is constant on this circle.

Here, the inclination of the sloping surface of the tapered section 89 may vary in any manner as far as the tapered section 89 is formed in such a manner that the wall thickness gradually becomes thicker toward the downstream side of the trajectory S. Specifically, as shown in FIG. 6C, the sloping surface may have a constant inclination containing a straight line L2, or may be formed to protrude downward relative to the straight line L2 such as a tapered section 89a indicated with a dashed line, or may be formed to protrude upward relative to the straight line L2 such as a tapered section 89b indicated with another dashed line.

In the meantime, the land section 91 has a flat surface which is formed to be continuous with the tapered section 89 on a downstream side of the trajectory S. The flat surface is orthogonal to the shaft center of the rotor shaft 15. Accordingly, a wall thickness of the land section 91 is constant in the circumferential direction.

Here, the trajectory S is a trajectory of oil droplets of the lubricating oil G to be supplied between the bearing pad 87 and the collar pad 69 on the assumption that the rotation speed of the rotor shaft 15 is constant while the supercharger 1 is in operation. A moving direction of the oil droplets is determined based on a centrifugal force which is generated by rotation of the rotor shaft 15 and applied to the oil droplets. In other words, the trajectory S indicates the trajectory of the oil droplets that move under influence of the centrifugal force. Note that the direction of the trajectory S is identical to the direction of the trajectory T.

The thrust bearing structure 39 is not limited only to the above-described configuration. For example, the thrust bearing structure 39 can be modified as described below.

Figure 8A:
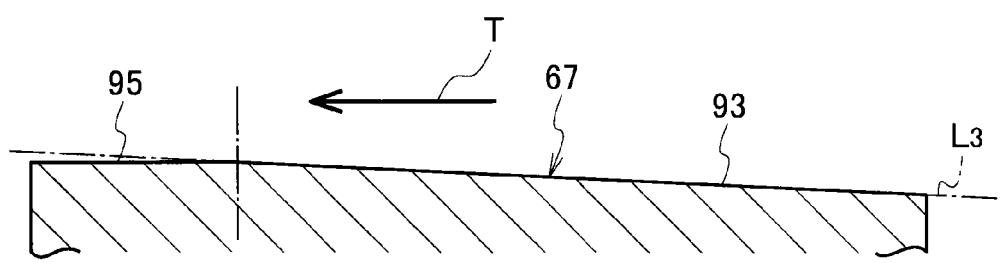
FIG. 8A is a cross-sectional view of a first collar pad taken along a trajectory of given oil droplets.

As shown in FIG. 7C and FIG. 8A, the collar pad 67 of the thrust collar 41 may have a similar structure to that of the bearing pad 87 of the thrust bearing 45. Specifically, the collar pad 67 may include a tapered section 93, and a land section 95 formed continuously with an outer edge of the tapered section 93. In this case, each of the tapered section 93 and the land section 95 is formed into an annular shape having the shaft center of the rotor shaft 15 as the center when viewed in the direction of the rotating axis (the front-rear direction). In the meantime, the bearing pad 71 of the thrust bearing 43 is formed as a flat surface which is orthogonal to the rotor shaft 15.

As shown in FIG. 8A, the tapered section 93 has a sloping surface formed in such a manner that its wall thickness gradually becomes thicker along the trajectory T toward the downstream side of the trajectory T. In other words, the tapered section 93 has the sloping surface formed to get closer to a surface (such as the bearing pad 71 of the thrust bearing 43), which is located in front of the thrust collar 41 and orthogonal to the shaft center of the rotor shaft 15, as the sloping surface gets farther away from the shaft center of the rotor shaft 15. Given a circle of an arbitrary radius having the shaft center of the rotor shaft 15 as its center, the wall thickness of the tapered section 93 is constant on this circle. In the meantime, the land section 95 has a flat surface which is formed to be continuous with the tapered section 93 on a downstream side of the trajectory T. The flat surface is orthogonal to the shaft center of the rotor shaft 15. Accordingly, a wall thickness of the land section 95 is constant in the circumferential direction.

Here, the inclination of the sloping surface of the tapered section 93 may vary in any manner as far as the tapered section 93 is formed in such a manner that the wall thickness gradually becomes thicker toward the downstream side of the trajectory T. Specifically, the sloping surface may have a constant inclination containing a straight line L3, or may be formed to protrude downward relative to the straight line L3, or may be formed to protrude upward relative to the straight line L3 (see FIG. 4A to FIG. 4C as the similar examples).

Figure 8B:
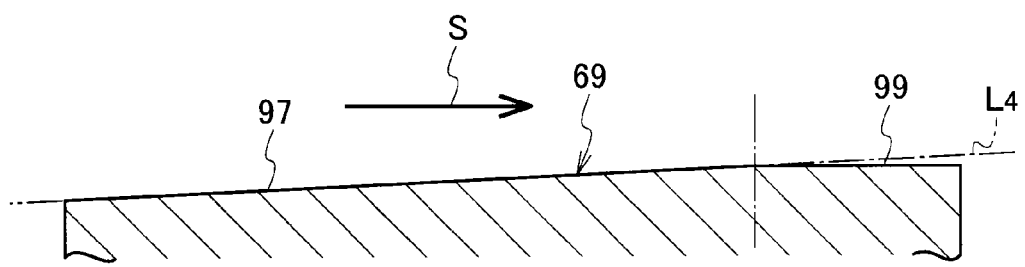
FIG. 8B is a cross-sectional view of a second collar pad taken along a trajectory of given oil droplets.

As shown in FIG. 7A and FIG. 8B, the collar pad 69 of the thrust collar 41 may have a similar structure to that of the bearing pad 71 of the thrust bearing 43. Specifically, the collar pad 69 may include a tapered section 97, and a land section 99 formed continuously with an outer edge of the tapered section 97. In this case, each of the tapered section 97 and the land section 99 is formed into an annular shape having the shaft center of the rotor shaft 15 as the center when viewed in the direction of the rotating axis (the front-rear direction). In the meantime, the bearing pad 87 of the thrust bearing 45 is formed as a flat surface which is orthogonal to the rotor shaft 15.

As shown in FIG. 8B, the tapered section 97 has a sloping surface formed in such a manner that its wall thickness gradually becomes thicker along the trajectory S toward the downstream side of the trajectory S. In other words, the tapered section 97 has the sloping surface formed to get closer to a surface (such as the bearing pad 87 of the thrust bearing 45), which is located behind the thrust collar 41 and orthogonal to the shaft center of the rotor shaft 15, as the sloping surface gets farther away from the shaft center of the rotor shaft 15. Given a circle of an arbitrary radius having the shaft center of the rotor shaft 15 as its center, the wall thickness of the tapered section 97 is constant on this circle. In the meantime, the land section 99 has a flat surface which is formed to be continuous with the tapered section 97 on a downstream side of the trajectory S. The flat surface is orthogonal to the shaft center of the rotor shaft 15. Accordingly, a wall thickness of the land section 99 is constant in the circumferential direction.

Here, the inclination of the sloping surface of the tapered section 97 may vary in any manner as far as the tapered section 97 is formed in such a manner that the wall thickness gradually becomes thicker toward the downstream side of the trajectory S. Specifically, the sloping surface may have a constant inclination containing a straight line L4, or may be formed to protrude downward relative to the straight line L4, or may be formed to protrude upward relative to the straight line L4 (see FIG. 4A to FIG. 4C as the similar examples).

Figure 9:
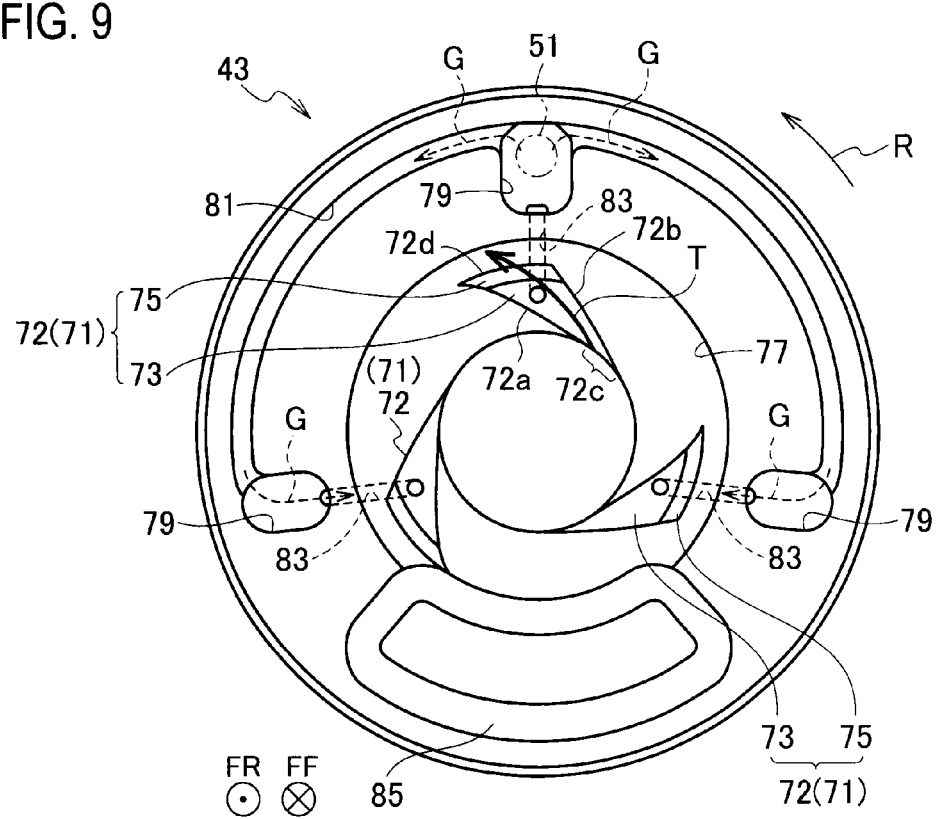
FIG. 9 is a view showing a rear-side face of a first thrust bearing according to the embodiment of the present invention.

As shown in FIG. 9, the bearing pad 71 of the thrust bearing 43 may include multiple pads 72 each having a tapered section 73 and a land section 75 and being arranged at given angles in the circumferential direction. In this case, each pad 72 includes a pair of edge portions 72a, 72b formed along the trajectory T, and a pair of arcuate edge portions 72c, 72d respectively formed of arcs having different radii. Here, initial positions of oil droplets assumed for determination of the shapes of the edge portion 72a and the edge portion 72b are located on the same circle that contains the arcuate edge portion 72c but are away from each other in the circumferential direction. Meanwhile, the arcuate edge portion 72c defines an inner edge of the tapered section 73 in the radial direction while the arcuate edge portion 72d defines an outer edge of the land section 75 in the radial direction. When the length of the arcuate edge portion 72c is small, each pad 72 is formed into a substantially sector-like shape when viewed in the axial direction (the front-rear direction) as shown in FIG. 9, for example. As described above, the edge portions 72a, 72b extend in a traveling direction of the trajectory T. That is to say, the lubricating oil G (the oil droplets) in a space defined by the edge portion 72a and the edge portion 72b can reach the land section 75 along the trajectory P shown in FIG. 5.

Figure 10:
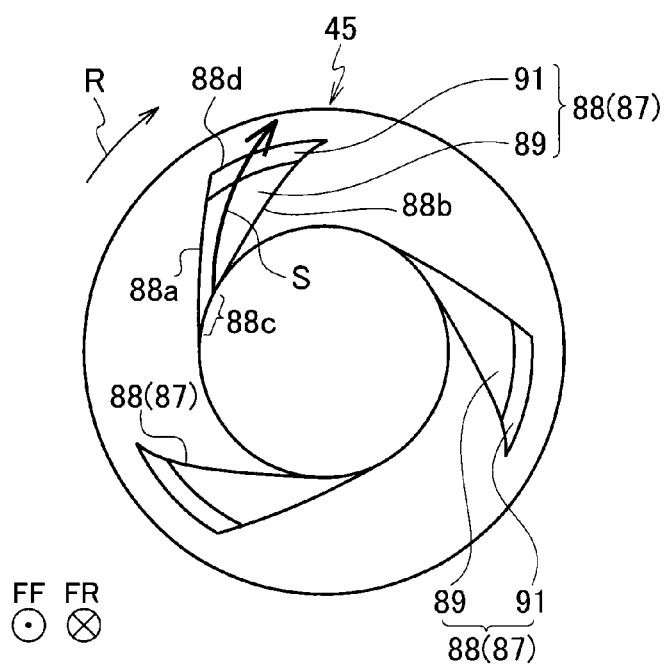
FIG. 10 is a view showing a front-side face of a second thrust bearing according to the embodiment of the present invention.

The bearing pad 87 of the thrust bearing 45 may also have a similar configuration to that of the bearing pad 71 shown in FIG. 9. Specifically, as shown in FIG. 10, the bearing pad 87 may include multiple pads 88 each having a tapered section 89 and a land section 91 and being arranged at given angles in the circumferential direction. In this case, each pad 88 includes a pair of edge portions 88a, 88b formed along the trajectory S, and a pair of arcuate edge portions 88c, 88d respectively formed of arcs having different radii. Here, initial positions of oil droplets assumed for determination of the shapes of the edge portion 88a and the edge portion 88b are located on the same circle that contains the arcuate edge portion 88c but are away from each other in the circumferential direction. Meanwhile, the arcuate edge portion 88c defines an inner edge of the tapered section 89 in the radial direction while the arcuate edge portion 88d defines an outer edge of the land section 91 in the radial direction. When the distance of the arcuate edge portion 88c is short, each pad 88 is formed into a substantially sector-like shape when viewed in the axial direction (the front-rear direction) as shown in FIG. 10, for example. As described above, the edge portions 88a, 88b extend in a traveling direction of the trajectory S. That is to say, the lubricating oil G (the oil droplets) in a space defined by the edge portion 88a and the edge portion 88b can reach the land section 91 along the trajectory P shown in FIG. 5.

The collar pad 67 as well as the collar pad 69 of the thrust collar 41 may also have configurations similar to those of the bearing pad 71 shown in FIG. 9 and the bearing pad 87 shown in FIG. 10. Specifically, as shown in FIG. 11B, the collar pad 67 may include multiple pads 68 each having a tapered section 93 and a land section 95 and being arranged at given angles in the circumferential direction. Meanwhile, the collar pad 69 may include multiple pads 70 each having a tapered section 97 and a land section 99 and being arranged at given angles in the circumferential direction. The pads 68, 70 have similar shapes to the pads 72 in FIG. 9 and the pads 88 in FIG. 10. Accordingly, detailed descriptions will be omitted herein.

Next, operation and effects of the embodiment will be described.

The exhaust gas taken in from the gas intake port 31 flows from the inlet side to the outlet side of the turbine impeller 27 through the turbine scroll flow passage 33. At this time, the pressure energy of the exhaust gas rotates the turbine impeller 27. Meanwhile, the compressor impeller 17 is connected to the turbine impeller 27 through the rotor shaft 15. As a consequence, the rotor shaft 15 and the compressor impeller 17 rotate as a unit together with the turbine impeller 27. Accordingly, the rotation of the compressor impeller 17 makes it possible to take the gas (such as the air) in from the intake port 21 and to compress the gas thus taken in. The compressed gas passes through the scroll flow passage 23 and is emitted from the exhaust port 25. Thus, it is possible to supercharge an engine or the like with the gas.

While the supercharger 1 is in operation, the lubricating oil G is supplied between the semi-floating metal 9 and the rotor shaft 15 through the oil supply port 47 and the oil supply passage 49. Thus, the lubricating oil G functions as a lubricant between the semi-floating metal 9 and the rotor shaft 15 and prevents seizure and the like between these components. The lubricating oil G supplied between the semi-floating metal 9 and the rotor shaft 15 passes through the receiving chamber 53 and is drained from the oil drain port 55 to the outside of the housing 3.

Moreover, while the supercharger 1 is in operation, the lubricating oil G is supplied between the thrust bearing 43 and the thrust collar 41 as well as between the thrust bearing 45 and the thrust collar 41 through the oil supply passage 51, the oil supply pockets 79, the communication passages 83, and the like. At this time, the lubricating oil G is also filled between the bearing pad 71 and the collar pad 67 as well as between the bearing pad 87 and the collar pad 69. As a consequence, cooperation of the bearing pad 71 and the collar pad 67 generates a wedge effect of the lubricating oil G, and the thrust load in the frontward direction acting on the rotor shaft 15 can be borne by this wedge effect. In addition, cooperation of the bearing pad 87 and the collar pad 69 generates a wedge effect of the lubricating oil G, and the thrust load in the rearward direction acting on the rotor shaft 15 can be borne by this wedge effect.

In this embodiment, one of the bearing pad and the collar pad facing each other is provided with the tapered section. The tapered section is the sloping surface formed in such a manner that its wall thickness gradually becomes thicker along the trajectory (see FIG. 5) of the given oil droplets toward the downstream side of the trajectory. The land section is formed continuously with the outer edge (a downstream-side end portion) of the sloping surface. Accordingly, it is possible to increase a proportion of the lubricating oil G that travels to or reaches the land section as compared to a case where the tapered section inclines along a rotating direction R of the rotor shaft. In other words, of the lubricating oil G supplied between the bearing pad and the collar pad, the proportion (a contribution ratio) of the lubricating oil G that contributes to the wedge effect can be enhanced, whereby the lubricating oil G can exert the wedge effect sufficiently and efficiently. As a result, the thrust bearing structure of this embodiment can achieve a high bearing performance against a thrust load.

The present invention is not limited only to the descriptions of the embodiment stated above but can also be embodied in various other modes including, for example, application of the above-described thrust bearing structure to rotary machines other than superchargers. It is to be also noted that the scope of the rights encompassed by the present invention is not limited to these embodiments.

What is claimed is:

1. A thrust bearing structure configured to bear a thrust load in an axial direction acting on a rotor shaft, comprising:
   a thrust collar fixed to the rotatable rotor shaft; and
   a thrust bearing facing the thrust collar, wherein
   the thrust collar includes a collar pad on a surface thereof facing the thrust bearing,
   the thrust bearing includes a bearing pad on a surface thereof facing the thrust collar at a position corresponding to the collar pad,
   the collar pad includes a tapered section, and a land section formed continuously with an outer edge of the tapered section,
   the bearing pad includes a flat surface which is orthogonal to a shaft center of the rotor shaft,
   the land section of the collar pad has a flat surface which is orthogonal to the shaft center of the rotor shaft,
   the tapered section of the collar pad includes a sloping surface formed to get closer to the bearing pad as the sloping surface gets farther away from the shaft center of the rotor shaft, and
   a wall thickness of the tapered section is constant on a circle of an arbitrary radius having the shaft center of the rotor shaft as a center of the circle.

2. The thrust bearing structure according to claim 1, wherein the collar pad is formed into an annular shape.

3. The thrust bearing structure according to claim 1, wherein the collar pad includes a plurality of pads, each of which is arranged in a circumferential direction and includes the tapered section, the land section, and a pair of edge portions formed along a trajectory of an oil droplet toward a downstream side thereof, the trajectory determined based on a centrifugal force generated by rotation of the rotor shaft and applied to the oil droplet when assuming the oil droplet is between the bearing pad and the collar pad.

4. The thrust bearing structure according to claim 3, wherein the trajectory of the oil droplet is a trajectory obtained on an assumption that a rotation speed of the rotor shaft is constant.

5. The thrust bearing structure according to claim 1, wherein
   the thrust bearing structure is used in a supercharger including: a housing; the rotor shaft rotatably provided to the housing; a compressor impeller attached to one end of the rotor shaft and configured to compress a gas by using a centrifugal force; and a turbine impeller attached to the other end of the rotor shaft and configured to generate torque by using pressure energy of a gas.

6. A supercharger configured to supercharge air to be supplied to an engine by using energy of an exhaust gas from the engine, comprising:
   a housing;
   a rotor shaft rotatably provided to the housing;
   a compressor impeller attached to one end of the rotor shaft and configured to compress a gas by using a centrifugal force;
   a turbine impeller attached to the other end of the rotor shaft and configured to generate torque by using pressure energy of a gas; and
   a thrust bearing structure configured to bear a thrust load in an axial direction acting on the rotor shaft, wherein
   the thrust bearing structure includes:
   a thrust collar fixed to the rotor shaft; and
   a thrust bearing facing the thrust collar, the thrust collar includes a collar pad on a surface thereof facing the thrust bearing, the thrust bearing includes a bearing pad on a surface thereof facing the thrust collar at a position corresponding to the collar pad, the collar pad includes a tapered section, and a land section formed continuously with an outer edge of the tapered section, the bearing pad includes a flat surface which is orthogonal to a shaft center of the rotor shaft, the land section of the collar pad has a flat surface which is orthogonal to the shaft center of the rotor shaft, the tapered section of the collar pad includes a sloping surface formed to get closer to the bearing pad as the sloping surface gets farther away from the shaft center of the rotor shaft, and a wall thickness of the tapered section is constant on a circle of an arbitrary radius having the shaft center of the rotor shaft as a center of the circle.

7. The supercharger according to claim 6, wherein the collar pad is formed into an annular shape.

8. The supercharger according to claim 6, wherein the collar pad includes a plurality of pads, each of which is arranged in a circumferential direction and includes the tapered section, the land section, and a pair of edge portions formed along a trajectory of an oil droplet toward a downstream side thereof, the trajectory determined based on a centrifugal force generated by rotation of the rotor shaft and applied to the oil droplet when assuming the oil droplet between the bearing pad and the collar pad.

9. The supercharger according to claim 8, wherein the trajectory of the oil droplet is a trajectory obtained on an assumption that a rotation speed of the rotor shaft is constant.

10. A thrust bearing structure configured to bear a thrust load in an axial direction acting on a rotor shaft, comprising:
a thrust collar fixed to the rotatable rotor shaft; and
a thrust bearing facing the thrust collar, wherein
the thrust collar includes a collar pad on a surface thereof facing the thrust bearing,
the thrust bearing includes a bearing pad on a surface thereof facing the thrust collar at a position corresponding to the collar pad,
the bearing pad includes a tapered section, and a land section formed continuously with an outer edge of the tapered section,
the collar pad includes a flat surface which is orthogonal to a shaft center of the rotor shaft,
the land section of the bearing pad has a flat surface which is orthogonal to the shaft center of the rotor shaft,
the tapered section of the bearing pad includes a sloping surface formed to get closer to the collar pad as the sloping surface gets farther away from the shaft center of the rotor shaft, and
a wall thickness of the tapered section is constant on a circle of an arbitrary radius having the shaft center of the rotor shaft as a center of the circle.

11. The thrust bearing structure according to claim 10, wherein the bearing pad is formed into an annular shape.

12. The thrust bearing structure according to claim 10, wherein the bearing pad includes a plurality of pads, each of which is arranged in a circumferential direction and includes the tapered section, the land section, and a pair of edge portions formed along a trajectory of an oil droplet toward a downstream side thereof, the trajectory determined based on a centrifugal force generated by rotation of the rotor shaft and applied to the oil droplet when assuming the oil droplet between the bearing pad and the collar pad.

13. The thrust bearing structure according to claim 12, wherein the trajectory of the oil droplet is a trajectory obtained on an assumption that a rotation speed of the rotor shaft is constant.

14. The thrust bearing structure according to claim 10, wherein the thrust bearing structure is used in a supercharger including: a housing; the rotor shaft rotatably provided to the housing; a compressor impeller attached to one end of the rotor shaft and configured to compress a gas by using a centrifugal force; and a turbine impeller attached to the other end of the rotor shaft and configured to generate torque by using pressure energy of a gas.

15. A supercharger configured to supercharge air to be supplied to an engine by using energy of an exhaust gas from the engine, comprising:
a housing;
a rotor shaft rotatably provided to the housing;
a compressor impeller attached to one end of the rotor shaft and configured to compress a gas by using a centrifugal force;
a turbine impeller attached to the other end of the rotor shaft and configured to generate torque by using pressure energy of a gas; and
a thrust bearing structure configured to bear a thrust load in an axial direction acting on the rotor shaft, wherein
the thrust bearing structure includes:
a thrust collar fixed to the rotor shaft; and
a thrust bearing facing the thrust collar,
the thrust collar includes a collar pad on a surface thereof facing the thrust bearing,
the thrust bearing includes a bearing pad on a surface thereof facing the thrust collar at a position corresponding to the collar pad,
the bearing pad includes a tapered section, and a land section formed continuously with an outer edge of the tapered section,
the collar pad includes a flat surface which is orthogonal to a shaft center of the rotor shaft,
the land section of the bearing pad has a flat surface which is orthogonal to the shaft center of the rotor shaft,
the tapered section of the bearing pad includes a sloping surface formed to get closer to the collar pad as the sloping surface gets farther away from the shaft center of the rotor shaft, and
a wall thickness of the tapered section is constant on a circle of an arbitrary radius having the shaft center of the rotor shaft as a center of the circle.

16. The supercharger according to claim 15, wherein the bearing pad is formed into an annular shape.

17. The supercharger according to claim 15, wherein the bearing pad includes a plurality of pads, each of which is arranged in a circumferential direction and includes the tapered section, the land section, and a pair of edge portions formed along a trajectory of an oil droplet toward a downstream side thereof, the trajectory determined based on a centrifugal force generated by rotation of the rotor shaft and applied to the oil droplet when assuming the oil droplet between the bearing pad and the collar pad.

18. The supercharger according to claim 17, wherein the trajectory of the oil droplet is a trajectory obtained on an assumption that a rotation speed of the rotor shaft is constant.

* * * * *